April 15, 1947. W. R. MERCER 2,419,025
COMPARATOR CIRCUIT FOR RADIO LOCATORS
Filed May 30, 1944
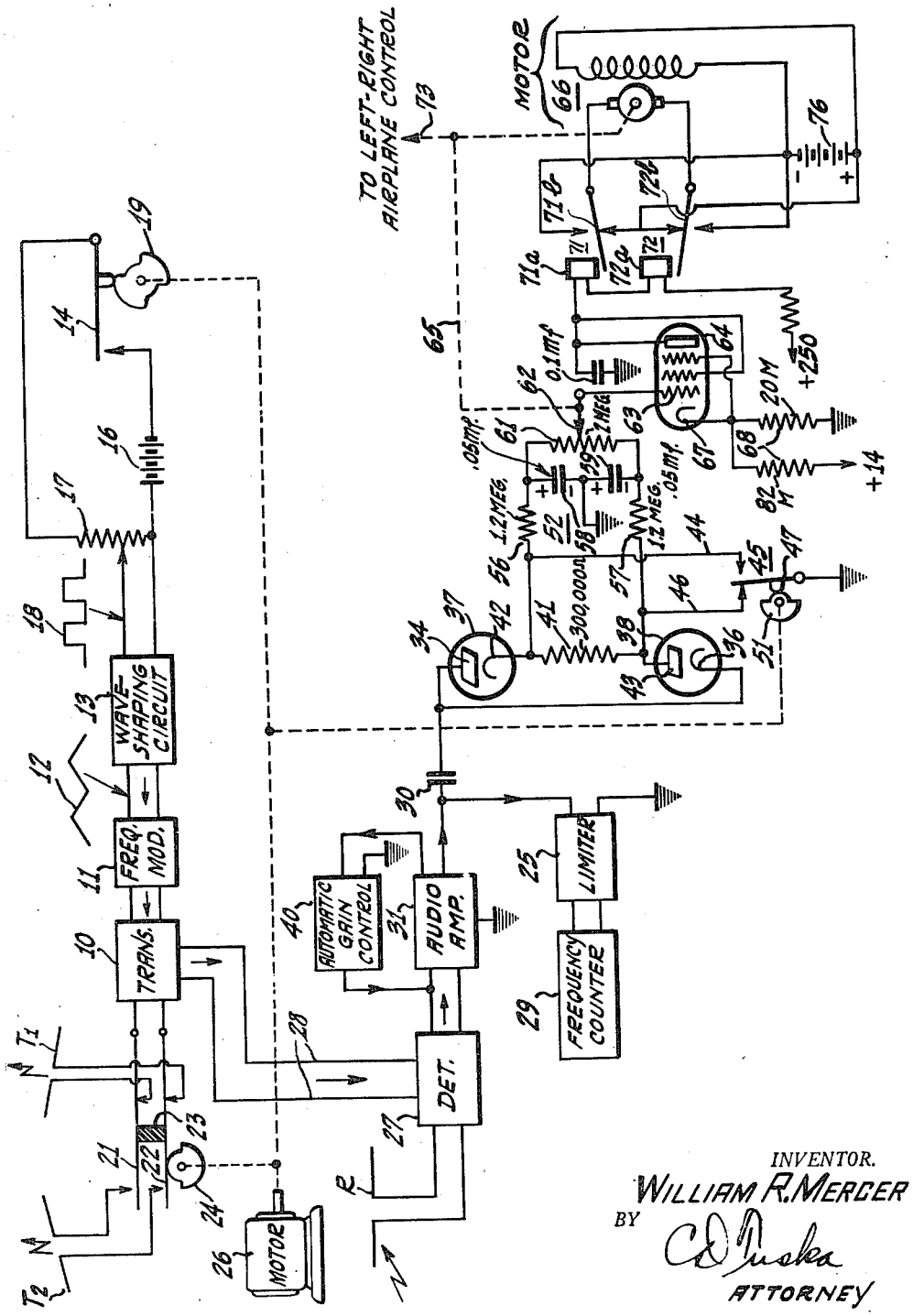
INVENTOR.
WILLIAM R. MERCER
BY
ATTORNEY Patented Apr. 15, 1947

2,419,025

UNITED STATES PATENT OFFICE 2,419,025

COMPARATOR CIRCUITS FOR RADIO LOCATORS

William R. Mercer, Hightstown, N. J., assignor to Radio Corporation of America, a corporation of Delaware Application May 30, 1944, Serial No. 538,028

7 Claims. (Cl. 250—1.54)

My invention relates to radio locator apparatus. It relates particularly to comparator circuits for comparing the amplitudes of reflected signals that are received during successive antenna switching periods in a system employing a directive antenna system that has its region of maximum field strength angularly displaced at the switching rate, and to systems utilizing such comparator circuits for directing an object in flight toward a target or other signal reflecting object.

The invention will be described specifically as applied to a locator system of the frequency-modulated type having left-right directive antennas positioned to have overlapping radiation patterns. The invention will also be described as applied for automatic left-right or rudder control of an airplane carrying the radio locator system.

An object of the invention is to provide an improved method of and means for obtaining in radio locator apparatus a signal that is representative of or proportional to the angular amount by which the locator antenna system fails to point directly toward a target or other reflecting object.

Another object of the invention is to provide an improved system including a follow-up circuit for causing a directive antenna system automatically to be pointed towards a target or other reflecting object.

Another object of the invention is to provide an improved comparator and follow-up circuit for a radio locator system wherein directive antennas are switched successively to the locator system for obtaining directional information.

Still another object of the invention is to provide an improved comparator and follow-up circuit for an aircraft control system in which reflected radio signals automatically control the direction of travel of the aircraft.

Still another object of the invention is to provide an improved circuit for comparing the amplitudes of reflected signals and in which there is a follow-up connection that acts without the introduction of time delay by an electrical filter.

In a preferred embodiment of the invention two directive antennas with overlapping radiation patterns are switched alternately to the locator system, and a comparator or amplitude comparison circuit is switched synchronously with the antenna switching. The comparator circuit comprises a pair of rectifiers in the audio frequency channel of the receiver which are switched alternately to supply signal to a filter that is balanced with respect to ground. A follow-up tap is provided on the output resistor of the filter.

The single figure of the drawing is a block and circuit diagram of a radio locator system embodying the invention.

The drawing shows the invention applied to a frequency-modulated radio locator system comprising a radio transmitter 10 which is cyclically frequency modulated by a suitable frequency modulator 11, such as a variable capacitor unit, that has a modulating signal 12 applied thereto from a wave shaping circuit 13. In the example illustrated, the modulating signal 12 is of triangular wave shape but it may be of some other wave form such as sinusoidal or sawtooth.

The triangular wave 12 may be produced by opening and closing a switch 14 in series with a battery 16 and a potentiometer resistor 17. This generates a square wave voltage 18 that is applied to the wave shaping circuit 13 to obtain the triangular voltage 12. In this case the shaping circuit 13 may be merely an integrating circuit. The switch 14 is operated by a motor driven cam 19. If desired, the wave shaping circuit and modulator described in application Serial No. 512,153, filed November 29, 1943, filed in the name of Irving Wolff and entitled Vibratory mechanical systems, may be employed.

The output of the transmitter 10 is radiated alternately from a pair of right-left directive antennas $T_1$ and $T_2$. This is accomplished by means of a suitable switch which, in the illustration, comprises switch arms 21 and 22 connected together mechanically by a block 23 of insulating material. The switch arms 21 and 22 are actuated by a cam 24 driven by a motor 26, the complete left-right switching cycle being $\frac{1}{60}$ second, for example. Instead of switching the transmitter antennas, a pair of directive receiving antennas may be switched, if preferred. Also, other known means of shifting the antenna system directivity may be employed in place of the means described.

Preferably, the frequency modulation sweep and the antenna switching are synchronized by driving the switch cam 19 from the same motor 26 that operates the antenna switch 21, 22. At the beginning the upsweep of each triangular wave 12 one of the transmitter antennas is connected to the transmitter 10. In the example illustrated, there is one complete cycle of frequency modulation during each antenna switching period.

After reflection from a target, the frequency modulated signals are received by a directive antenna R and supplied to a beat frequency detector 27. The frequency modulated signals are also supplied to the detector 27 over a line 28 directly from the transmitter 10 whereby the beat frequency of the detector output is proportional to the distance to the target as is well known in the art. This distance may be indicated by a frequency counter 29 supplied with signal through an amplitude limiter 25.

For obtaining directional information, output signal from the detector 27 is also supplied through an audio frequency amplifier 31 and through a coupling capacitor 30 to the anode 34 and cathode 36 of a pair of rectifiers such as diodes 37 and 38, respectively.

The received signals contain directional information because the amplitudes of the signals received during radiation from the right and left antennas $T_1$ and $T_2$, respectively, will not be equal unless the antenna system comprising the pair of antennas $T_1$ and $T_2$ is pointing directly toward the reflecting target so that the target is in the region of equal field strength of the two antennas.

An automatic gain control circuit 40 preferably is provided for the audio amplifier 31. If an automatic gain control circuit is not provided and the signal strength becomes so large that limiting occurs in the audio amplifier, then the output of the audio amplifier will be a signal that looks as though the antenna is pointed toward the target regardless of its direction with respect to the target.

Referring more specifically to the left-right control portion of the system, the diodes 37 and 38 have an output resistor 41 connected between their cathode 42 and anode 43. The electrodes 42 and 43 are connected through conductors 44 and 46, respectively, to the contact points of a switch 45 having a switch arm 47 which is connected to ground. In some cases it may be preferred to connect the switch arm 47 to a positive potential point on a low impedance voltage divider resistor (not shown) for providing some of the bias on the amplifier tube 64 referred to hereinafter.

The electrodes 42 and 43 are connected alternately to ground by means of the switch 45. Thus, either of the diodes 37 or 38 is operative to supply current through the output resistor 41 according to the position of the switch arm 47. The switch arm 47 is actuated by a cam 51 that is driven by the motor 26 in synchronism with the antenna switching. With the switch arm 47 in the left-hand position illustrated, current flows through the diode 37 and through the load resistor 41 during the positive half cycle. During the negative half cycle the diode 38 is conducting whereby the coupling capacitor 30 is discharged substantially to ground potential. Similarly, when the switch arm 47 is in the right-hand position, current flows during the negative half cycle from ground through switch arm 47, the conductor 44 and through the load resistor 41 and the diode 38 back to the coupling capacitor 30. On the positive half cycle, the capacitor 30 is discharged substantially to ground potential through the diode 37 whereby blocking of capacitor 30 due to a direct-current charge is prevented.

A filter 52 that is balanced with respect to ground is connected across the resistor 41. The filter 52 comprises series resistors 56 and 57 and shunt capacitors 58 and 59 which are connected from the filter resistors 56 and 57, respectively, to ground. A filter output resistor 61 is connected across the capacitors 58 and 59. The resistive and capacitive values of the filter 52 are such as to smooth out current varying at the switching rate. A variable tap 62 on the output resistor 61, which functions as a signal output tap and as a follow-up tap, is connected electrically to the control grid 63 of an amplifier tube 64. If follow-up operation is desired, the tap 62 is connected mechanically, as indicated by the broken line 65, to a reversible motor 66 which is controlled by the output of the amplifier tube 64. The cathode 67 of amplifier tube 64 is connected to a point on a voltage divider 68 which holds the tube 64 properly biased for amplifier operation.

The direct-current output of the amplifier tube 64 flows through the relay coils 71a and 72a of a "high" current marginal relay 71 and a "low" current marginal relay 72 having switch arms 71b and 72b, respectively. These switch arms are connected to make the reversible motor 66 run in one direction or the other, depending upon the relay energization as explained below whereby the airplane is turned in one direction or the other by means of a mechanical connection, indicated at 73, to the airplane rudder or left-right control system. In the specific example shown, the D.-C. output of tube 64 so adjusted by adjusting the grid bias that when there is no received signal, and also when the antennas $T_1$ and $T_2$ point directly toward the target, only the relay 72 is energized and the relay switch arms 71b and 72b are in the positions illustrated. If the D.-C. output of tube 64 increases above this "neutral" direct-current value, the relay 71 is also energized and the motor 66 runs in one direction to turn the airplane in one direction; if, on the other hand, the D.-C. output decreases below this "neutral" value, both relays are deenergized and the motor 66 runs in the other direction to turn the airplane toward the opposite direction. In one specific design the relay 72 opened on 3.4 milliamperes while the relay 71 opened on 4.3 milliamperes. The relays 72 and 71 closed at 4 milliamperes and 6 milliamperes, respectively.

Considering the circuit operation more in detail, when the right antenna $T_1$ is connected to the transmitter 10, rectified current flows from diode 37 through resistor 41 to ground by way of the switch arm 47. At this time the filter capacitor 58 is connected across resistor 41 through filter resistor 56 and through ground. During the next switching period, the antenna $T_2$ is connected to the transmitter 10, and rectified current flows from ground through the switch arm 47, the lead 44, the resistor 41 and through the diode 38. This time the filter capacitor 59 is connected across resistor 41 through filter resistor 57 and through ground. It is evident that the direction of charge for capacitors 58 and 59 is such that their terminals remote from ground are positive and negative, respectively. If the amplitudes of the received signals during the two switching periods are equal, the filter capacitors 58 and 59 are charged equally and the midpoint of resistor 61 is at ground potential. With the tap 62 at said midpoint, the output of amplifier 64 has a value such that the relay 71 is deenergized, the relay 72 is energized, and the motor motor 66 is thus disconnected from a battery or other power supply 76.

If the pair of antennas $T_1$ and $T_2$ are directed to one side of the target whereby it is not in the region of equal field strength of the two antennas, then the reflected signals during the two switching periods will be unequal and the filter capacitors 58 and 59 will have unequal charges. Therefore, the tap 62 (assuming it is at the midpoint of resistor 61) will not be at ground potential and either both of the relays 71 and 72 will be energized or both will be deenergized, depending upon whether the "left" signal or the "right" signal is the greater, whereby the battery 76 will be connected with the proper polarity to the armature 77 of the motor 66. Therefore, the motor 66 rotates in the direction to turn the airplane and the antennas T1 and T2 toward the target by means of the connection 73 to the airplane controls. When the antennas T1 and T2 point directly toward the target so that it is in the region of equal field strength of the two antennas, the midpoint of resistor 61 again is at ground potential and the motor 66 stops.

When it is desirable to employ a follow-up control to prevent the airplane (and the antennas) from being turned first too far to the right and then too far to the left, the mechanical connection 65 may be provided between the adjustable tap 62 and the motor 66. Then, as the airplane is turned toward one direction, the tap 62 is moved along resistor 61 toward the electrical ground point of the resistor 61.

It will be evident that the motor 66 will reverse and begin moving the rudder back to its center or neutral position before the airplane has been turned enough to point the antennas T1 and T2 directly toward the reflecting target. By the time the antennas T1 and T2 are pointing directly toward the target, the rudder is back to its neutral position.

The amount that the motor 66 moves from its center position, and hence the rate of turn of the airplane, is a function of the ratio of right to left signal and hence the number of degrees off course of the airplane.

It will be apparent that if there is more "right" signal through diode 37 than "left" signal through diode 38 whereby capacitor 58 receives the larger charge, the amount of control by the "right" signal will be reduced as desired by the follow-up action while the airplane is turning toward the desired direction if the tap 62 is being moved toward the upper end of resistor 61 during this time, since the ground point on resistor 61 has shifted toward the upper end of the resistor.

Thus by means of the balancing bridge action of the motor 66 and the resistor 61, the airplane's rate of turn is always proportional to the degrees off course of the airplane with respect to the target. If the follow-up ratio of rate of turn of the airplane to the degrees off course is made small enough, hunting of the airplane will be prevented.

One of the advantages of the present invention is that the follow-up tap 62 is at the direct-current end of the rectifier-filter combination so that the filter 52 will not introduce any time lag in the transfer of a voltage change from the follow-up tap 62 to the grid 63 of the amplifier tube 64. In systems where the follow-up tap precedes the filter, the lag may be great enough to adversely affect the operation of the follow-up circuit and cause hunting of the motor unless suitable precautions are taken.

If it is desired to apply the present invention to an aircraft that is to be flown without a pilot, i. e., to apply it to a drone, the aircraft may be held at a predetermined altitude by means of a system such as described and claimed in the copending application Serial No. 484,458, filed April 24, 1943, in the names of Royden C. Sanders, Jr., and John H. Purl, and entitled Aircraft control system.

In the drawing various voltages and circuit values have been given merely by way of example. The values are given in ohms, thousands of ohms and megohms and in microfarads, the letter M indicating where ohms are given in thousands.

I claim as my invention:

1. In a direction finding system, a directive antenna system and means for angularly displacing its region of maximum field strength during successive switching periods, a radio receiver, a pair of rectifiers each having an anode and a cathode, a coupling capacitor, the anode of one rectifier and the cathode of the other rectifier being connected through said coupling capacitor to the output circuit of said receiver, an output impedance unit connected between the other anode and the other cathode of said rectifiers, switching means for making one of said rectifiers pass current through said output impedance unit during one antenna switching period and for making the other of said rectifiers pass current in the same direction through said impedance unit during the next antenna switching period, a filter connected across said impedance unit, the midpoint of said filter being grounded, an output impedance unit connected across the output terminals of said filter, and an output tap on an intermediate point on said output impedance unit.

2. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods, a pair of rectifiers each having an anode and a cathode, a coupling capacitor, the anode of one rectifier and the cathode of the other rectifier being connected through said coupling capacitor to the output circuit of said receiver, an output impedance unit connected between the other anode and the other cathode of said rectifiers, switching means for making one of said rectifiers pass current through said output impedance unit during one antenna switching period and for making the other of said rectifiers pass current in the same direction through said impedance unit during the next antenna switching period, a filter connected across said impedance unit, the midpoint of said filter being grounded, an output impedance unit connected across the output terminals of said filter, and an output tap on an intermediate point on said output impedance unit.

3. In a direction finding system, a directive antenna system and means for angularly displacing its region of maximum field strength during successive switching periods, a radio receiver, a pair of rectifiers each having an anode and a cathode, a coupling capacitor, the anode of one rectifier and the cathode of the other rectifier being connected through said coupling capacitor to the output circuit of said receiver, an output impedance unit connected between the other anode and the other cathode of said rectifiers, switching means for connecting one end of said output impedance unit through a low impedance connection to ground during one antenna switching period and for connecting the other end of said output impedance unit through a low impedance connection to ground during the next antenna switching period, a filter connected across said impedance unit, the midpoint of said filter being grounded, an output impedance unit connected across the output terminals of said filter, and an output tap on an intermediate point on said filter output impedance unit.

4. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods, a pair of rectifiers each having an anode and a cathode, a coupling capacitor, the anode of one rectifier and the cathode of the other rectifier being connected through said coupling capacitor to the output circuit of said receiver, an output impedance unit connected between the other anode and the other cathode of said rectifiers, switching means for connecting one end of said output impedance unit through a low impedance connection to ground during one antenna switching period and for connecting the other end of said output impedance unit through a low impedance connection to ground during the next antenna switching period, a filter connected across said impedance unit, the midpoint of said filter being grounded, an output impedance unit connected across the output terminals of said filter, and an output tap on an intermediate point on said filter output impedance unit.

5. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods, a pair of rectifiers each having an anode and a cathode, a coupling capacitor, the anode of one rectifier and the cathode of the other rectifier being connected through said coupling capacitor to the output circuit of said receiver, an output impedance unit connected between the other anode and the other cathode of said rectifiers, switching means for making one of said rectifiers pass current through said output impedance unit during one antenna switching period and for making the other of said rectifiers pass current in the same direction through said impedance unit during the next antenna switching period, a filter connected across said impedance unit, said filter including shunt capacitors connected between each side of said filter and ground, a resistor connected across the output terminals of said filter, and a tap on said resistor for supplying an output signal.

6. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods, a pair of rectifiers each having an anode and a cathode, the anode of one rectifier and the cathode of the other rectifier being connected to the output circuit of said receiver, an output impedance unit connected between the other anode and the other cathode of said rectifiers, switching means for making one of said rectifiers pass current through said output impedance unit during one antenna switching period and for making the other of said rectifiers pass current in the same direction through said impedance unit during the next antenna switching period, a filter connected across said impedance unit to obtain a direct-current voltage, said filter including shunt capacitors connected between each side of said filter and ground, a resistor connected across the output terminals of said filter, a variable tap on said resistor, an amplifier having an input electrode connected to said variable tap, and a servo means including said amplifier for turning said antenna system toward said reflecting object in response to said region being more to one side of said object during one of said switching periods than to the other side of said object during the other switching period.

7. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods, a pair of rectifiers connected to rectify the output of said receiver, an output impedance unit for said rectifiers, switching means for making one of said rectifiers pass current through said impedance unit during one antenna switching period and for making the other of said rectifiers pass current in the same direction through said impedance unit during the next antenna switching period, a filter connected across said impedance unit to obtain a direct-current voltage, said filter including shunt capacitors connected between each side of said filter and ground, a reversible motor, relay means for controlling the direction and amount of rotation of said motor in accordance with the direct-current output of said filter, means for controlling the direction in which said region of maximum field strength is pointed, and a servo connection between said motor and said last means for turning said antenna system toward said reflecting object in response to said region being more to one side of said object during one of said switching periods than to the other side of said object during the other switching period.

WILLIAM R. MERCER.

REFERENCES CITED

The following references are of record in the file of this patent:

UNITED STATES PATENTS

| Number | Name | Date |
| --- | --- | --- |
| 2,176,469 | Moueix | Oct. 17, 1939 |

OTHER REFERENCES

*Ex parte Stimpson*, 1910 C. D. 223; 160 O. G. 1271.